United States Patent [19]

Nishikawa

[11] 4,350,874

[45] Sep. 21, 1982

[54] HOT AIR SUPPLY TYPE ELECTRIC OVEN

[75] Inventor: Hideo Nishikawa, Osaka, Japan

[73] Assignee: Imanishi Flexible Tube Mfg. Co., Ltd., Japan

[21] Appl. No.: 177,836

[22] Filed: Aug. 14, 1980

[30] Foreign Application Priority Data

Feb. 25, 1980 [JP] Japan .................................. 55-22444

[51] Int. Cl.³ .......................... A21B 1/22; F27B 11/00
[52] U.S. Cl. ................................. 219/400; 126/21 A; 219/413; 219/405
[58] Field of Search ............... 219/365, 385, 400, 405, 219/408, 413, 429, 433; 99/401, 447; 126/21 A, 261

[56] References Cited

U.S. PATENT DOCUMENTS

| 2,466,349 | 4/1949 | Anderson | 219/400 X |
| 2,523,796 | 9/1950 | Weeks | 219/400 |
| 3,692,968 | 9/1972 | Yasuoka | 219/400 X |
| 4,010,341 | 3/1977 | Ishammar | 219/400 |
| 4,132,216 | 1/1979 | Guibert | 126/261 |
| 4,295,034 | 10/1981 | Assmann | 219/400 |

FOREIGN PATENT DOCUMENTS

| 7810686 | 5/1979 | Netherlands | 219/400 |
| 411670 | 6/1934 | United Kingdom | 219/400 |

Primary Examiner—Volodymyr Y. Mayewsky
Attorney, Agent, or Firm—McGlew and Tuttle

[57] ABSTRACT

An electric oven comprises a base made of a heat-resisting material and provided with a meat support member, an outer case removably rested on a stepped portion of the peripheral wall of the base, a reflector disposed within the outer case in the neighborhood of a ceiling thereof to define an upper radiating chamber and a lower heating chamber, a heat generator provided within the heating chamber, and a hot air fan also provided within the heating chamber and serving to transfer heat generated from the heat generator as hot air into a roasting chamber defined within the outer case. The hot air fan is driven from a drive motor, which also drives a cooling fan disposed within the radiating chamber. The outer case is provided with a switch means for closing and opening an electric circuit connecting a power source to the heat generator and motor for driving the hot air fan and cooling fan such that the electric circuit is closed when the outer case is placed on the base and opened when the outer case is raised.

8 Claims, 3 Drawing Figures

HOT AIR SUPPLY TYPE ELECTRIC OVEN

BACKGROUND OF THE INVENTION

1. Field of the Invention

This invention relates to electric ovens and, more particularly, to an electric oven, in which hot air is supplied to a heating chamber for roasting edible meat such as beaf, pork and chicken.

2. Prior Art

A prior-art electric oven include an arrangement, in which meat is heated from a heater of a sheath heater disposed therebelow. In this electric oven, the heater of the sheath heater is subject to contamination and corrosion by water and fat dripping from the meat being done. Also, the fat dropping on the heater is burnt thereby to produce smoke.

SUMMARY OF THE INVENTION

An object of the invention, accordingly, is to provide an electric oven of a hot air supply type, which is simple in construction and very convenient to handle and can beautifully cook meat without generation of smoke due to fat during the heating.

It is a feature of the electric oven according to the invention that meat can be uniformly heated within a substantially closed atmosphere without the possibility of losing its peculiar taste.

The above and other objects, features and advantages of this invention will become more apparent from the description of a preferred embodiment thereof when taken in conjunction with the accompanying drawings.

DESCRIPTION OF THE PREFERRED EMBODIMENT

Figure 1:
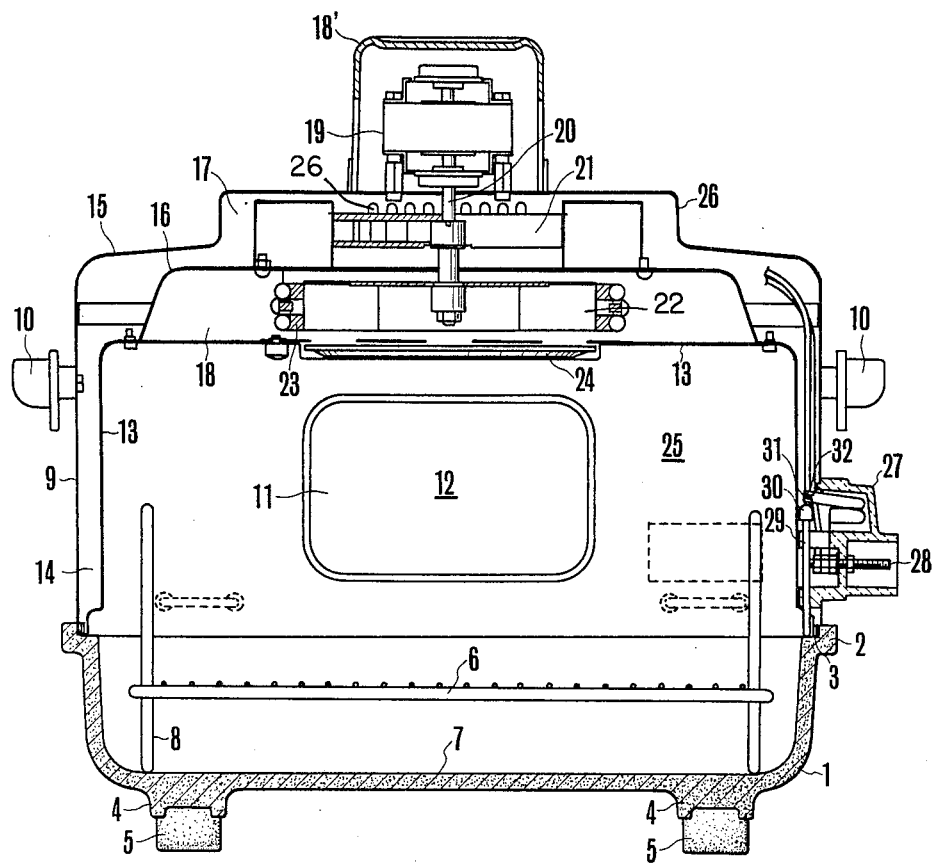
FIG. 1 is an elevational view, partly in section, showing an embodiment of the air supply type electric oven according to the invention.
Figure 2:
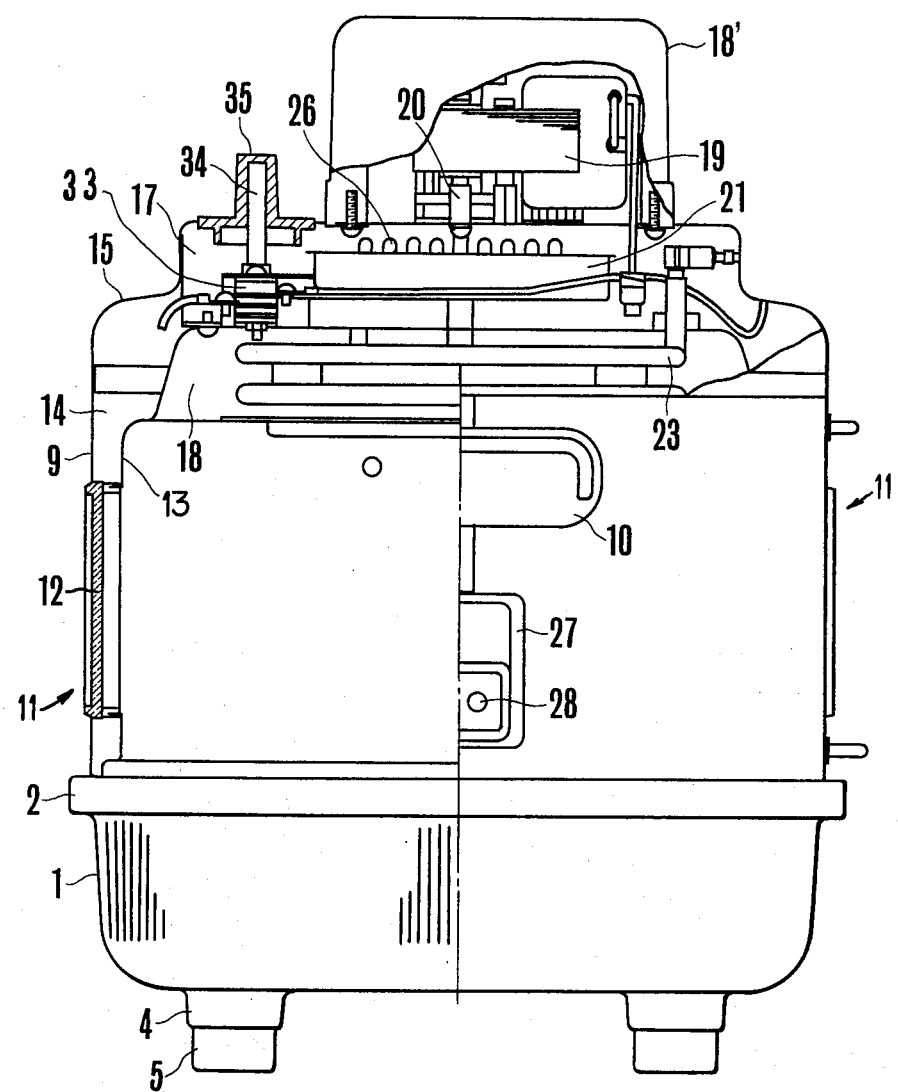
FIG. 2 is a side view, partly in section, showing the same embodiment.

Referring now to the drawings, more particularly to FIGS. 1 and 2, there is shown an electric oven of the hot air supplying type with a base 1 having substantially rectangular plan form. The base 1 is produced by baking a ceramic material in glost firing so that it has an excellent heat-resisting property and is capable of having fat readily washed from it. The base 1 has a horizontal planar portion and a vertical peripheral wall portion 2 transversely extending therefrom. The peripheral wall 2 has an inner stepped portion 3, at its upper end as well as projections 4, projecting substantially from the four corners of its bottom, to provide for its stability. Cushioning pieces 5, as slip prevention means, are fitted in a recess formed in the individual projections 4. A grid-like support member 6, formed by appropriately bending and assembling rust-free metal wires of a suitable diameter, is mounted within a spacer circumscribed by the base 1. The member 6 extends substantially horizontally, that is, parallel to and spaced apart a suitable distance from the inner bottom wall 7 of the base 1. To this end, upright supports 8 are provided at symmetrical positions.

An outer case 9 is formed from a metal plate by a press work. It is adapted such that its lower end can be removably placed on the inner wall stepped portion 3 of peripheral wall 2.

Grips 10, made of a heat-resisting synthetic resin, are installed at the opposite sides of the outer case 9 for the transportation thereof.

A window 11 is provided substantially at the center of the front wall of the outer case 9. A heat-resisting transparent glass plate 12 is fitted within window 11 so that the state of meat which is placed on the support member 6 for heating, can be observed.

A heat shield 13 is disposed to face the inner surfaces of the outer case 9 at a suitable distance therefrom, thus defining a space 14. The outer case 9 has a ceiling 15, and a reflector 16 is disposed to extend between the heat shield 13 and ceiling 15 and define two chambers, namely an upper heat radiation chamber 17 and a lower heating chamber 18. A motor chamber 18' which outwardly projects from central portion of the ceiling 15 of the outer case 9. A motor 19 is installed within the motor chamber 18'. The motor 19 has vertically depending shaft 20. A Silocco fan 21 and a turbo-fan 22 are mounted on respective, appropriately spaced-apart upper and lower portions of the shaft 20 so that they are rotated in unison therewith.

The turbo-fan 22 is disposed in the heating chamber 18, in which a sheath heater 23 is also provided to surround the turbo-fan 22. Thus, with the rotation of the motor 19, heat produced from the sheath heater 23 is supplied as hot air through a filter 24 provided in a central portion of the heat shield 13 into a roasting chamber 25 by the turbo-fan 22. At the same time, the Silocco fan 21 is rotated to forcibly exhaust hot air in the radiating chamber 17, which results from the radiation of heat produced from the sheath heater 23, through an exhaust hole 26 to the outside of the outer case 9, thus preventing excessive temperature rise of the ceiling of the outer case. One side wall of the outer case 9 is provided with a socket 27, which is a molding of a heat-resisting insulating material, and into which a power supply code plug is inserted. It constitutes a power source circuit for the motor 19 and sheath heater 23 together with inner leads.

A socket pin 28 is provided in the socket 27. A vertically movable switch rod 29, as is more clearly shown in the enlarged-scale sectional view of FIG. 3, is provided at its upper end with an operating piece 30 made of an insulating material, in engagement with a movable contact 31.

The movable contact 31 is an elastic metal plate, for instance a phosphor bronze plate, which is normally spaced apart from and facing a fixed contact 32. Contacts 31 and 32 are electrically insulated from each other. When the switch rod 29 is raised relative to the outer case 9, the movable contact 31 is brought into contact with the fixed contact 32 against its elastic force, thereby closing the electric circuit including the sheath heater 23 and motor 19 for energizing them. The switch rod 29 is adapted such that its lower end strikes and is raised by the stepped inner peripheral wall portion 3 of the base 1 at the time when placing the outer case 9 on the base 1. Conversely, by raising the outer case 9 from the base 1 the switch rod 29 is adapted to fall due to its own weight, whereby the movable contact 31 is separated from the fixed contact 32 by its own elastic restoring force to open the electric circuit. As shown in FIG. 2, an automatic temperature controller 33 is provided within the radiating chamber 17. It includes a movable pin 34 for setting the working temperature. The movable pin 34 has an extension upwardy projecting from the ceiling of the outer case 9, and it is provided at its upper end with an adjustment knob 35. The automatic temperature controller 33 also includes a temperature-sensor section having a capillary tube extending into the heating chamber 18, so that it can automatically control heat produced from the sheath heater 23 provided within the heating chamber 18.

Figure 3:
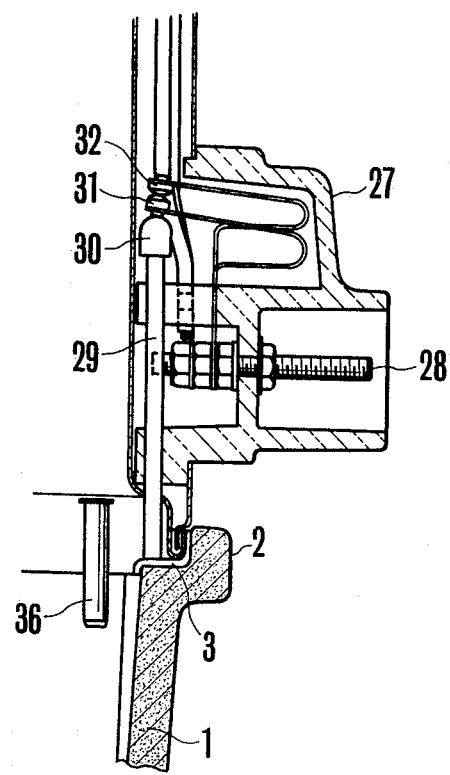
FIG. 3 is a fragmentary enlarged-scale sectional view showing a switch means in the same embodiment.

The outer case 9 is provided with support legs 36, illustrated in FIG. 3, projecting from the four corners of its lower end and having a length greater than the stroke of vertical movement of the switch rod. The lower end of the switch rod 29 of the switch mechanism downwardly projects from the lower end of the outer case 9 when the outer case 9 is raised from the base 1. Therefore, unless the support legs 36 are provided, by placing the raised outer case 9 on a flat surface such as a table the switch rod 29 is raised thereby closing the electric circuit of the motor and sheath heater. In this case, the motor and sheath heater are energized, so that the table surface is heated. This is liable to cause a fire accident and is thus dangerous. With the provision of the support legs 36, the lower end of the outer case 9 is sufficiently spaced from the table surface when the outer case is placed on the table and, in this state, the electric circuit is never closed, while the outer case can be stably held on the table.

In operation, the meat to be cooked is placed on the support member 6 provided in the base 1, and the sheath heater is energized, whereby the temperature inside the roasting chamber 25 is increased so that the meat is roasted. At the time of eating the roasted meat, the outer case 9 is removed from the base 1, and the finished meat on the support member 6 of the base 1 may be directly cut with a knife and a fork to a suitable size and then transferred onto a separate dish. Since the base 1 is made of a ceramic material, its heat storage property, i.e., heat insulation effect, is superior to what is made of a metal plate. Thus, the finished meat will not be quickly cooled and can be eaten in the hot state.

As has been described in the foregoing, the the electric oven according to the invention comprises a base made of a heat-resistant material and provided with a meat support member, an outer case removably mounted on a stepped portion of the peripheral wall of the base, a reflector disposed within the outer case in the vicinity of a ceiling thereof to define an upper radiating chamber and a lower heating chamber, a heat generator provided within the heating chamber, and a hot air fan also provided within the heating chamber and serving to transfer heat generated from the heat generator as hot air into a roasting chamber defined within the outer case, meat placed on the support member in the base is heated from the heat generator located above it, and water and fat produced from it as it is being heated fall from the support member supporting it and is collected in the base. Thus, unlike the conventional electric oven in which meat is heated from a heater disposed therebelow, there is no possibility for water or fat to fall onto a heat of the sheath heater so that the heater is never contaminated or corroded. In addition, since fat does not fall onto the heater, smoke from the burning of fat is not generated. Further, since a hot air fan and a cooling fan are disposed, respectively, in the heating chamber and radiating chamber, mounted on the shaft of a common drive motor, they can be driven simultaneously. Although the heat generator may be located near the ceiling of the outer case, excessive heating of the ceiling of the outer case alone is prevented by the cooling fan which is operated concurrently with the hot air fan. Furthermore, the outer case, which is removable from the base, is provided with a switch means for closing and opening an electric circuit connecting a power source to the heat generator and motor for driving the hot air fan and cooling fan. The switch means is operative to close the electric circuit when the outer case is placed on the base and to open the circuit when the outer case is raised. The heater circuit is opened by raising the outer case even when the oven is in operation, so that an accidental fire is not possible.

Moreover, since an automatic temperature controller for presetting the temperature of the roasting chamber within the outer case that is heated from the heat generator to provide for a constant finish temperature of the roasted meat, there is no possibility for the temperature within the outer case to be excessively elevated. Thus, in case when repeatedly roasting meat, a uniform finish can be obtained. Still further, since the outer case is provided with support legs projecting from suitable portions of its lower end, when it is raised from the stepped inner peripheral wall portion of the base and placed on a table, its lower end is sufficiently spaced apart from the table by the support legs, so that there is no possibility for the switch means to be inadvertently closed, and thus safety is ensured in this respect. Further, since a turbo-fan is used as the hot air fan provided within the heating chamber and a Silocco fan as the cooling fan provided within the heating chamber and these fans are simultaneously driven from a single motor, the construction is very simple, and also noise, offensive to the ear, is hardly produced during the heating.

What is claimed is:

1. An electric oven of hot air supply type comprising a base made of a heat-resistant material, a meat support member mounted to said base, said base including a planar portion and a peripheral wall portion extending transversely therefrom, said peripheral wall portion having a stepped surface at its upper end, a case member removably mounted on a stepped surface of said peripheral wall portion of said base to define a roasting chamber within said case member and base member, a reflector mounted within said case member adjacent the upper end thereof and defining a heating chamber and a radiating chamber, a heat generator mounted within said heating chamber, a hot air fan mounted within said heating chamber for transferring heat generated by said heat generator as hot air to said roasting chamber, a cooling fan provided within said radiating chamber adjacent to said heating chamber, and a motor provided atop said case member and coupled to said cooling fan and said hot air fan for simultaneously driving said cooling fan and said hot air fan.

2. An electric oven according to claim 1, comprising an electric circuit connectable to a power source to energize said heat generator and also to said motor, switch means on said case member for opening and closing said electric circuit, said switch means including a switch rod adapted to be raised relative to said case member to close said electric circuit when said case member is placed on said base and lowered relative to said case member by the weight of said rod to open said electric circuit when said case member is raised.

3. An electric oven according to claim 1, further comprising an automatic temperature controller within said radiating chamber operative to control said electric circuit for said heat generator responsive to the temperature of the inside of said heating chamber.

4. An electric oven according to claim 1, further comprising support legs depending from said case member on its end rested on said stepped surface of said peripheral wall portion.

5. An electric oven according to claim 1, wherein said hot air fan is a turbo-fan and wherein said cooling fan is a Silocco fan.

6. An electric oven according to claim 2, further comprising an automatic temperature controller within said radiating chamber operative to control said electric circuit for said heat generator responsive to the temperature of the inside of said heating chamber.

7. An electric oven according to claim 6, further comprising support legs depending from said case member on its end rested on said stepped surface of said peripheral wall portion.

8. An electric oven according to claim 7, wherein said hot air fan is a turbo-fan and wherein said cooling fan is a Silocco fan.

* * * * *

REEXAMINATION CERTIFICATE (2800th)

United States Patent [19]

Nishikawa

[11] B1 4,350,874
[45] Certificate Issued Feb. 20, 1996

[54] HOT AIR SUPPLY TYPE ELECTRIC OVEN

[75] Inventor: Hideo Nishikawa, Osaka, Japan

[73] Assignee: Imanishi Flexible Tube Mfg. Co., Ltd., Osaka, Japan

Reexamination Request:
No. 90/003,533, Aug. 5, 1994

Reexamination Certificate for:
Patent No.: 4,350,874
Issued: Sep. 21, 1982
Appl. No.: 177,836
Filed: Aug. 14, 1980

[30] Foreign Application Priority Data

Feb. 25, 1980 [JP] Japan .................................. 55-22444

[51] Int. Cl.$^6$ .............................. A21B 1/22; F27B 11/00
[52] U.S. Cl. ...................... 219/400; 219/413; 219/405; 126/21 A
[58] Field of Search ..................... 219/400, 385, 219/405, 408, 413, 429, 433; 99/401, 447; 126/21 A, 261

[56] References Cited

U.S. PATENT DOCUMENTS

| | | | |
|---|---|---|---|
| 2,214,630 | 9/1940 | Wheeler | 219/400 |
| 2,466,349 | 4/1949 | Anderson | 219/400 X |
| 2,523,796 | 9/1950 | Weeks | 219/400 |
| 2,619,734 | 12/1952 | Geldhof et al. | 219/400 |
| 3,529,582 | 9/1970 | Hurko et al. | |
| 4,132,216 | 1/1979 | Guibert | |
| 4,286,456 | 9/1981 | Sisti et al. | 219/400 X |
| 4,295,034 | 10/1981 | Assman | |

FOREIGN PATENT DOCUMENTS

| | | |
|---|---|---|
| 7810686 | 5/1979 | Netherlands . |
| 2007515 | 5/1975 | United Kingdom . |

*Primary Examiner*—Philip H. Leung

[57] ABSTRACT

An electric oven comprises a base made of a heat-resisting material and provided with a meat support member, an outer case removably rested on a stepped portion of the peripheral wall of the base, a reflector disposed within the outer case in the neighborhood of a ceiling thereof to define an upper radiating chamber and a lower heating chamber, a heat generator provided within the heating chamber, and a hot air fan also provided within the heating chamber and serving to transfer heat generated from the heat generator as hot air into a roasting chamber defined within the outer case. The hot air fan is driven from a drive motor, which also drives a cooling fan disposed within the radiating chamber. The outer case is provided with a switch means for closing and opening an electric circuit connecting a power source to the heat generator and motor for driving the hot air fan and cooling fan such that the electric circuit is closed when the outer case is placed on the base and opened when the outer case is raised.

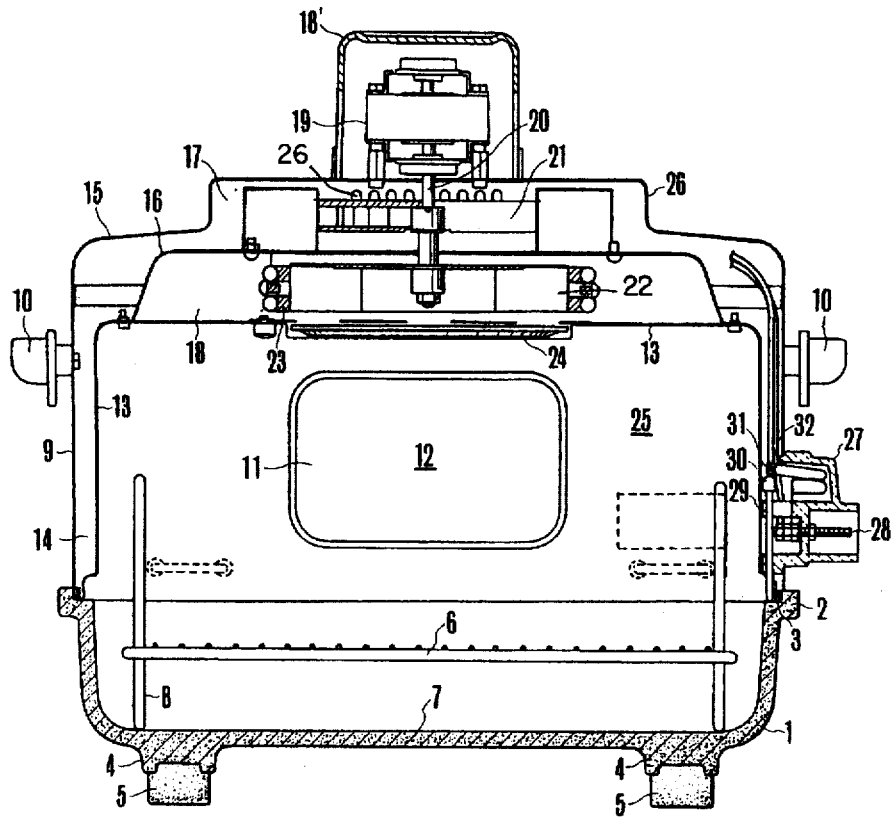

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2–8, dependent on an amended claim, are determined to be patentable.

New claims 9–23 are added and determined to be patentable.

1. An electric oven of hot air supply type comprising a base made of a heat-resistant material, a meat support member mounted to said base, said base including a planar portion and a peripheral wall portion extending transversely therefrom, said peripheral wall portion having a stepped surface at its upper end, a case member removably mounted on [a] *said* stepped surface of said peripheral wall portion of said base to define a roasting chamber within said case member and base member, a reflector mounted within said case member adjacent the upper end thereof and defining a heating chamber and a radiating chamber, a heat generator mounted within said heating chamber, a hot air fan mounted within said heating chamber for transferring heat generated by said heat generator as hot air to said roasting chamber, a cooling fan provided within said radiating chamber adjacent to said heating chamber, and a motor provided atop said case member and coupled to said cooling fan and said hot air fan for simultaneously driving said cooling fan and said hot air fan.

9. *An electric oven of hot air supply type, said electric oven comprising:*

*a base made of a heat-resistant material;*

*a meat support member mounted to said base,*

*said base including a planar portion and a peripheral wall portion extending transversely therefrom,*

*said peripheral wall portion having a stepped surface at its upper end;*

*a case member removably mounted on said stepped surface of said peripheral wall portion of said base to define a roasting chamber within said case member and base member;*

*a reflector mounted within said case member adjacent the upper end thereof and defining a heating chamber and a radiating chamber;*

*a heat generator mounted within said heating chamber;*

*a hot air fan mounted within said heating chamber for transferring heat generated by said heat generator as hot air to said roasting chamber;*

*a cooling fan provided within said radiating chamber adjacent to said heating chamber; and*

*a motor provided atop said case member and coupled to said cooling fan and said hot air fan for simultaneously driving said cooling fan and said hot air fan,*

*said case member having an upper wall/ceiling with an upwardly facing surface that is exposed at the top of the case,*

*said cooling fan being directly exposed to the upper wall/ceiling.*

10. *The electric oven according to claim 9 wherein the motor has a vertically extending shaft to which the cooling fan and hot air fan are coupled.*

11. *The electric oven according to claim 9 wherein the cooling fan and hot air fan are mounted on a shaft that is rotatable about an axis that extends through the motor.*

12. *The electric oven according to claim 9 wherein the reflector has a horizontal extent and the radiating chamber extends over substantially the entire horizontal extent of the reflector.*

13. *The electric oven according to claim 9 wherein the radiating chamber extends under substantially the entire upper wall/ceiling.*

14. *The electric oven according to claim 13 wherein the upper wall/ceiling spans the peripheral wall portion.*

15. *The electric oven according to claim 14 wherein the reflector resides beneath the wall/ceiling.*

16. *The electric oven according to claim 9 wherein there is at least one exhaust hole in the case communicating from within the radiating chamber to externally of the electric oven.*

17. *The electric oven according to claim 16 wherein the exhaust hole is located above the heat generator.*

18. *The electric oven according to claim 16 wherein the cooling fan rotates about a vertical axis and the exhaust hole is at approximately the same height as the cooling fan.*

19. *The electric oven according to claim 9 wherein the reflector has an inverted, cup-shaped configuration.*

20. *The electric oven according to claim 19 wherein the reflector has a vertical extent and the heat generator resides entirely within the vertical extent of the reflector.*

21. *The electric oven according to claim 19 wherein the reflector has a vertical extent and the hot air fan resides entirely within the vertical extent of the reflector.*

22. *The electric oven according to claim 9 wherein the cooling fan is directly exposed to the reflector.*

23. *The electric oven according to claim 9 wherein the cooling fan is immediately adjacent to the upper wall/ceiling.*

* * * * *

REEXAMINATION CERTIFICATE (3225th)

United States Patent
Nishikawa

[11] B2 4,350,874
[45] Certificate Issued  Jun. 17, 1997

[54] HOT AIR SUPPLY TYPE ELECTRIC OVEN

[75] Inventor: Hideo Nishikawa, Osaka, Japan

[73] Assignee: Imanishi Flexible Tube Mfg. Co., Ltd., Osaka, Japan

Reexamination Request:
No. 90/004,236, May 3, 1996

Reexamination Certificate for:
Patent No.: 4,350,874
Issued: Sep. 21, 1982
Appl. No.: 177,836
Filed: Aug. 14, 1980

Reexamination Certificate B1 4,350,874 issued Feb. 20, 1996

[30] Foreign Application Priority Data

Feb. 25, 1980 [JP] Japan ................. 55-22444

[51] Int. Cl.$^6$ ............. A21B 1/22; F27B 11/00
[52] U.S. Cl. ............. 219/400; 219/405; 219/413; 126/21 A
[58] Field of Search ............. 219/385, 400, 219/405, 408, 413, 429, 433; 99/401, 447; 126/21 A, 261

[56] References Cited

FOREIGN PATENT DOCUMENTS

| 2 409 736 | 7/1979 | France . |
|---|---|---|
| 26 23 946 A1 | 12/1977 | Germany . |
| 26 23 946 B2 | 2/1980 | Germany . |

*Primary Examiner*—Philip H. Leung

[57] ABSTRACT

An electric oven comprises a base made of a heat-resisting material and provided with a meat support member, an outer case removably rested on a stepped portion of the peripheral wall of the base, a reflector disposed within the outer case in the neighborhood of a ceiling thereof to define an upper radiating chamber and a lower heating chamber, a heat generator provided within the heating chamber, and a hot air fan also provided within the heating chamber and serving to transfer heat generated from the heat generator as hot air into a roasting chamber defined within the outer case. The hot air fan is driven from a drive motor, which also drives a cooling fan disposed within the radiating chamber. The outer case is provided with a switch means for closing and opening an electric circuit connecting a power source to the heat generator and motor for driving the hot air fan and cooling fan such that the electric circuit is closed when the outer case is placed on the base and opened when the outer case is raised.

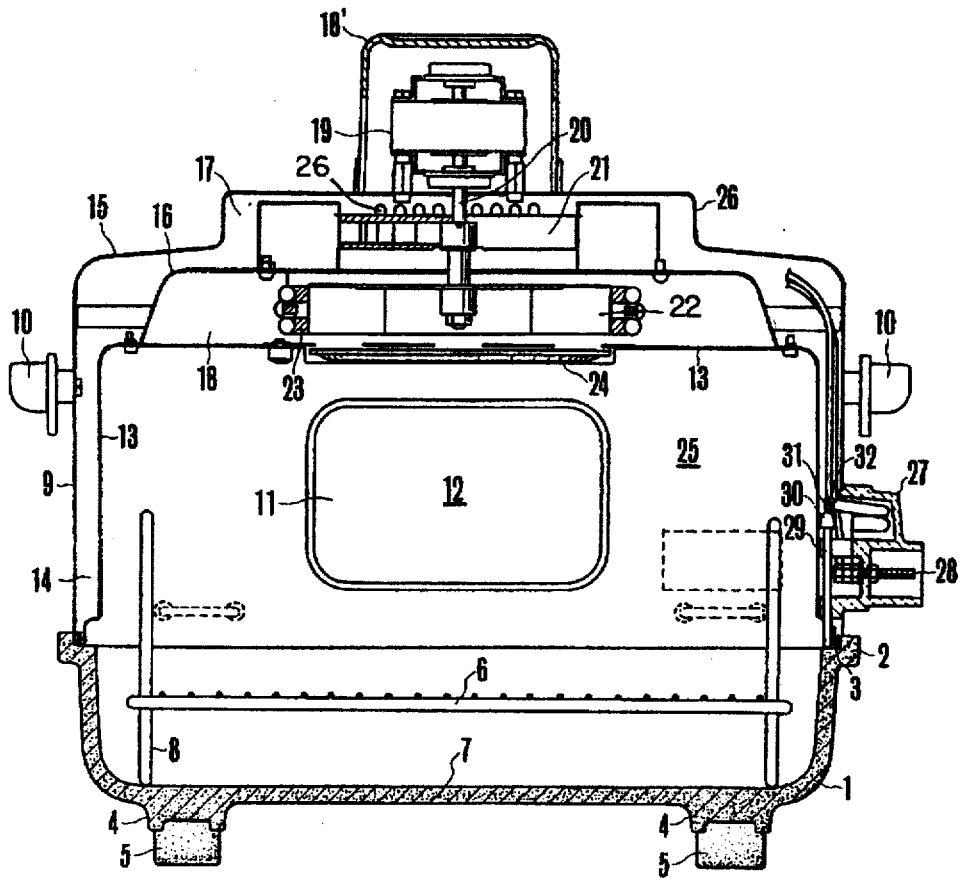

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–23 is confirmed.

* * * * *